(12) United States Patent
Baraff et al.

(10) Patent No.: US 7,973,805 B1
(45) Date of Patent: Jul. 5, 2011

(54) METHODS AND APPARATUS FOR INVISING OBJECTS IN COMPUTER ANIMATION

(75) Inventors: David Baraff, Oakland, CA (US);
Michael Fong, Novato, CA (US);
Christine Waggoner, Berkeley, CA (US)

(73) Assignee: Pixar, Emeryville, CA (US)

( * ) Notice: Subject to any disclaimer, the term of this patent is extended or adjusted under 35 U.S.C. 154(b) by 767 days.

(21) Appl. No.: 11/857,867

(22) Filed: Sep. 19, 2007

Related U.S. Application Data

(60) Provisional application No. 60/866,368, filed on Nov. 17, 2006.

(51) Int. Cl.
*G09G 5/00* (2006.01)
(52) U.S. Cl. .......................................... 345/629
(58) Field of Classification Search .................... 345/629
See application file for complete search history.

(56) References Cited

U.S. PATENT DOCUMENTS

| | | | | |
|---|---|---|---|---|
| 5,966,134 A * | 10/1999 | Arias | ............................. | 345/589 |
| 6,266,071 B1 * | 7/2001 | Stam et al. | .................... | 345/473 |
| 6,377,276 B1 * | 4/2002 | Ludtke | ........................... | 345/620 |
| 7,027,054 B1 * | 4/2006 | Cheiky et al. | .................. | 345/473 |
| 7,538,764 B2 * | 5/2009 | Salomie | ......................... | 345/420 |
| 2005/0071139 A1 * | 3/2005 | Patwardhan et al. | ............. | 703/9 |
| 2006/0085767 A1 * | 4/2006 | Hinckley et al. | .............. | 715/863 |
| 2007/0043544 A1 * | 2/2007 | Song et al. | ......................... | 703/9 |
| 2007/0274604 A1 * | 11/2007 | Schechner et al. | ............ | 382/254 |
| 2009/0012931 A1 * | 1/2009 | Appa et al. | ......................... | 707/2 |
| 2009/0027494 A1 * | 1/2009 | Cavallaro et al. | ............. | 348/135 |

OTHER PUBLICATIONS

Particle-based Viscoelastic Fluid Simulation Simon Clavet, Philippe Beaudoin, and Pierre Poulin LIGUM, Dept. IRO, Université de Montréal, Computer Animation 2005, Jul. 29-31, 2005, ACM.*

Sunil Hadap, "Collision detection and proximity queries" SIGGRAPH course, 2004.*

\* cited by examiner

*Primary Examiner* — Javid A Amini
(74) *Attorney, Agent, or Firm* — Kilpatrick Townsend & Stockton LLP

(57) ABSTRACT

A method for invising objects includes receiving information indicating an intersection between a first object and a second object. Visibility of the first object is modified based on the amount of interpenetration between the first object and the second object. A predetermined threshold may be received. The visibility of the first object may be reduced while the amount of the interpenetration fails to exceed the predetermined threshold. The first object may be made invisible when the predetermined threshold is exceeded.

16 Claims, 7 Drawing Sheets

METHODS AND APPARATUS FOR INVISING OBJECTS IN COMPUTER ANIMATION

CROSS-REFERENCES TO RELATED APPLICATIONS

This application claims the benefit of and priority to U.S. Provisional Patent Application No. 60/866,368, filed Nov. 17, 2006 and entitled "System and Method for Hair Invising," the entire disclosure of which is herein incorporated by reference for all purposes.

BACKGROUND

The following disclosure relates to computer graphics. More specifically, the following relates to techniques for invising objects in computer animation.

In computer graphics imagery, secondary objects, such as hair, clothing, and plants are often too complex for an animator to directly control at every stage of a computer animation. Instead, the animator typically specifies the physics and/or physical properties of these secondary or dynamic objects. A computer program then simulates the motions and positions of the secondary objects over time. Often physically-based numerical methods and techniques are used to simulate the secondary or dynamic objects based on the physics and/or physical properties of the individual secondary objects.

In general, for simulated hair or fur objects, the animator specifies the physical properties and construction of the hair or fur. For example, the animator may specify how the hair bends or flexes due to forces or collisions with solid objects. The animator may further specify how the hair deforms or collides with itself. Moreover, the animator may specify external forces that act on the hair, such as gravity and wind.

In addition to modeling the physical properties of secondary or dynamic objects, the animator may specify motions and/or positions of kinematic or non-simulated objects (e.g., characters upon which clothing objects rest). The animation of a non-simulated object generally is independent of and otherwise unaffected by motions and positions of simulated objects. However, the motions and positions of the non-simulated objects often are the principal influencer of motions and positions of simulated objects, such as the clothing and hair likely to be associated with a kinematic character.

In general, computer animation of characters with hair or fur typically requires producing models containing hundreds of thousands, to millions of strands of hair. One challenge is to ensure that at every frame of the animation, the position of the hairs avoid intersections.

Typically, there are two basic approaches for eliminating intersections between objects. In one approach, the geometry of one object is changed to avoid intersections. For example, a single hair object being simulated may be bent around another object rather than simply passing through the other object. However, when there are hundreds of thousands to millions of objects, changing the geometry of each of the objects becomes prohibitive.

Another approach involves refraining from drawing or rendering an object when an intersection occurs. This approach may be called "invising." Typically, detecting when an object intersects with another object at any given frame of an animation is not particularly challenging. However, one challenge is the determination whether to "invis" (i.e., refrain from rendering or drawing) the intersecting object such that the resulting animation appears coherent over time.

Consider an example of an animal character object. The animal character is covered in hair (or fur). Hairs on the animal character which only graze another portion of the character (e.g., a paw or digit) may change their state from visible to invisible with only minor changes in situation geometry. This typically causes two problems. The first typically occurs if the situation geometry is changing slowly but smoothly, for example, when one or more digits of the animal character move slowly across to a patch of the hair on the torso of the character. As the digits move slowly relative to the patch of hair, the abrupt change from visible to invisible, or vice versa, of hairs in the patch could cause a subtle yet apparent annoying visual artifact.

The second problem typically is exhibited the closer hairs on the animal character come to just grazing another portion of the character. In this scenario, subject even the slightest changes in the situation geometry the hairs transition from visible to invisible and back. In one example, small chest expansions of the torso of the character due to the character's breathing will cause the hairs on the torso just grazing a paw or digit of the character to shift ever so slightly with respect to the paw or digit. As a result, grazing hairs may continually change from visible to invisible, all without much detectable change of the underlying torso or paw geometry. This typically manifests itself as hairs that change visibility state for seemingly no reason at all.

One solution is to introduce coherence by maintaining a history of an object's visibility state. For example, if a hair is only just grazing a paw or digit associated with the animal character, and it has been determined that the hair still should be visible in one frame, if the hair just grazes the paw or digit in the next frame, the same decision could be applied to the hair in the next frame. This generally avoids the problem of hairs flickering on and off for no (apparent) reason, but still does not solve the problem of abrupt transitions when a hair is finally deemed to have intersected strongly enough for a requirement that the hair be made invisible. Furthermore, this approach adds an extremely serious restriction. The approach requires one to render frames in order, from first to last, to maintain a history of each hair's visibility state over time.

This is an unacceptable requirement, because most modern production environments depend on being able to distribute the rendering of a sequence of frames over many computers. For example, in a 100 frame sequence, it is typical for each frame to be rendered by a separate computer approximately during the same time. This requires that the computations for each frame be independent of all other frames. However, by requiring that the visibility of a hair at frame n be depend on the hair's visibility at frame n−1, a dependency is introduced such that the frames are required to be rendered sequentially, rather than the computations been performed in parallel.

Accordingly, what is desired are improved methods and apparatus for solving some of the problems discussed above, while reducing further drawbacks, some of which are discussed above.

BRIEF SUMMARY

In various embodiments, a method for invising objects includes receiving information indicating an intersection between a first object and a second object. Visibility of the first object is modified based on an amount of interpenetration between the first object and the second object.

In some embodiments, modifying the visibility of the first object based on the amount of interpenetration between the first object and the second object includes modifying the visibility of the first object in response to a maximum amount of interpenetration between the first object and the second object. Modifying the visibility of the first object based on the amount of interpenetration between the first object and the second object may includes determining a maximum distance inside of the second object of a set of points along the first object. The visibility of the first object may be modified in response to the maximum distance inside the second object of the set of points.

In one embodiment, a predetermined threshold is received. Modifying the visibility of the first object based on the amount of interpenetration between the first object and the second object may include reducing the visibility of the first object in response to the amount of interpenetration when the amount of the interpenetration fails to exceeds the predetermined threshold. The first object may be "invised" or made invisible when the amount of the interpenetration exceeds the predetermined threshold.

In further embodiments, modifying the visibility of the first object includes reducing the visibility of the first object. Modifying the visibility of the first object may include adjusting a radius associated with the first object. Modifying the visibility of the first object may include adjusting transparency associated with the first object. Modifying the visibility of the first object may also include adjusting a first color associated with the first object. Adjusting the first color associated with the first object may include adjusting the first color closer to a second color.

In several embodiment, a computer program product is stored on a computer readable medium for invising objects. The computer program product includes code for receiving information indicating an intersection between a first object and a second object, and code for modifying visibility of the first object based on an amount of interpenetration between the first object and the second object.

In various embodiments, a system for invising objects includes a processor and a memory coupled to the processor. The memory is configured to store a set of instructions which when executed by the processor cause the processor to receive information indicating an intersection between a first object and a second object, and modify visibility of the first object based on an amount of interpenetration between the first object and the second object.

In further embodiments, a method for providing visibility of objects includes receiving information specifying a first object and a second object. Visibility of the first object is adjusted in response to the second object absent a history.

In some embodiments, adjusting visibility of the first object in response to the first object absent history includes modifying visibility of the first object in response to the second object based on the amount of interpenetration between the first object and the second object. Adjusting visibility of the first object in response to the first object absent history may include modifying visibility of the first object in a first frame in response to the second object absent a determination of visibility of the first object in response to the second object in a second frame.

In one embodiment, a computer program product is stored on a computer readable medium for providing visibility of objects. The computer program product includes code for receiving information specifying a first object and a second object, and code for adjusting visibility of the first object in response to the second object absent a history.

In various embodiments, a system for providing visibility of objects includes a processor and a memory coupled to the processor. The memory is configured to store a set of instructions which when executed by the processor cause the processor to receive information specifying a first object and a second object, and adjust visibility of the first object in response to the second object absent a history.

A further understanding of the nature and the advantages of the inventions disclosed herein may be realized by reference of the remaining portions of the specification and the attached drawings.

BRIEF DESCRIPTION OF THE DRAWINGS

In this disclosure, reference is made to the accompanying drawings. Understanding that these drawings are not to be considered limitations in the scope of the invention as defined by the claims, the presently described embodiments and the presently understood best mode of the invention are described with additional detail through use of the accompanying drawings.

DETAILED DESCRIPTION

In various embodiments, a computer simulation program provides animators, graphic designers, and industries that rely on computer graphics the ability to modify the visibility of objects. For example, in one embodiment, the computer simulation program determines whether a first object intersects with a second object. Based on the amount of interpenetration between the first object and the second object, the computer simulation program modifies the visibility of the first object. For example, the computer simulation program may modify the geometry, color, and/or transparency of the object to gradually reduce the visibility of the object, or completely make the object invisible.

Based on the amount of interpenetration, the computer simulation program can modify the visibility of the object absent a prior determination of the state or visibility of the object. For example, absent a visibility history, images and frames, such as for feature-length films and animations, can be rendered in parallel. Thus, dependencies are not introduced that required the images or frames to be rendered sequentially.

In further embodiments, the computer simulation program also prevents abrupt transitions in the visibility state of an object. Based on a maximum amount of interpenetration, visibility of simulated objects (e.g., grazing hairs) may be modified to continually change from visible to invisible, without the simulated objects changing visibility states for seemingly no reason at all caused by small changes in geometry.

Figure 1:
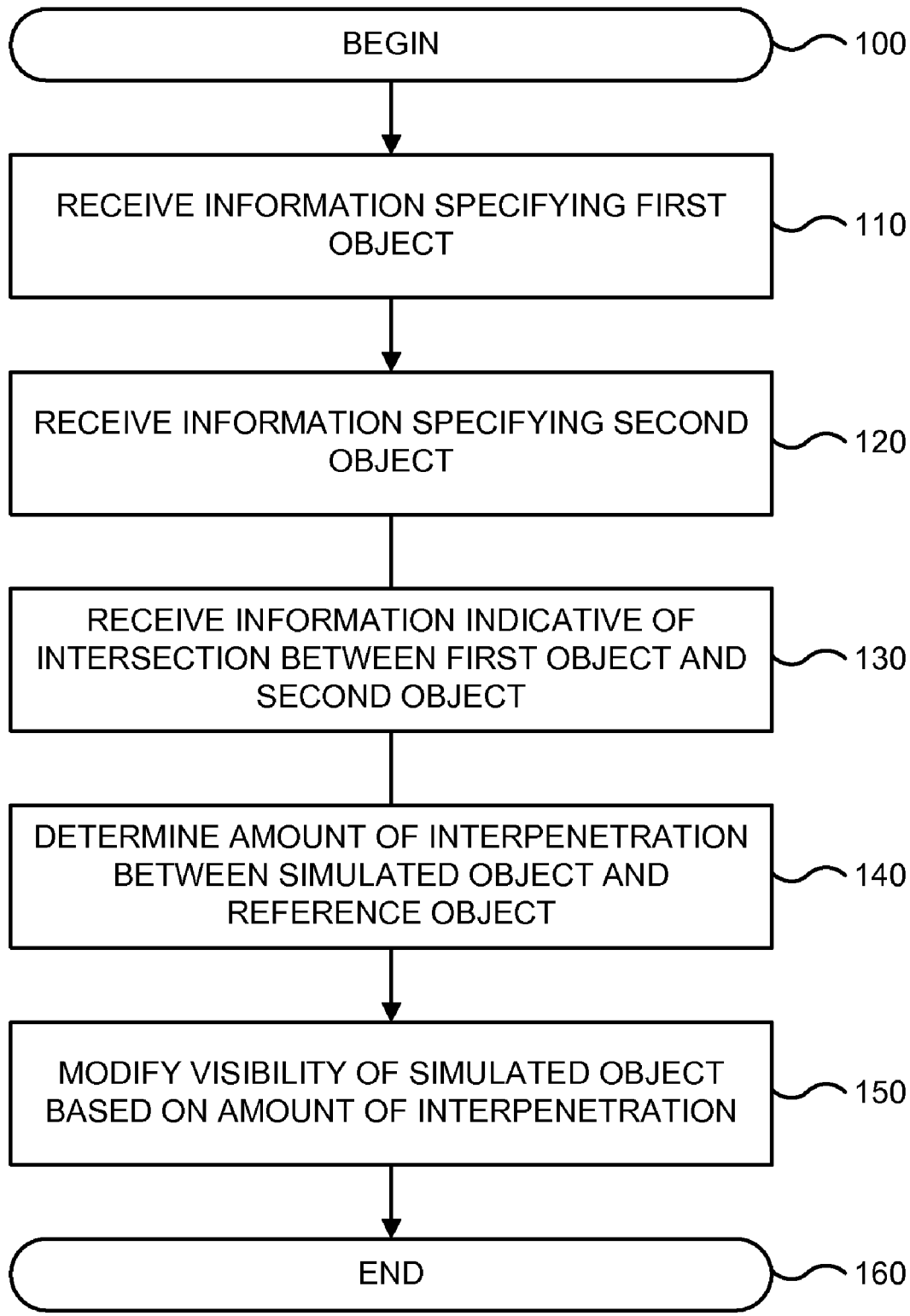
FIG. 1 is a flowchart of a method for invising simulated objects in one embodiment according to the present invention.

FIG. 1 is a flowchart of a method for invising simulated objects in one embodiment according to the present invention. The processing depicted in FIG. 1 may be performed by software modules (e.g., instructions or code) executed by a processor of a computer system, by hardware modules of the computer system, or combinations thereof. FIG. 1 begins in step 100.

In step 110, information is received specifying a first object. For example, data representing a 2D or 3D model may be received. In step 120, information is received specifying a second object. In step 130, information is received indicative of an intersection between the first object (e.g., a simulated object) and the second object (e.g., a reference or kinematic object). In general, an intersection is any coexistence of location.

In step 140, the amount of interpenetration is determined between the first object and the second object. In one example, the amount of the intersection is measured by measuring distance at which the first object penetrates the second object at each point along the portion of the first object found inside of the second object. The maximum of these determined distances from which each point along the first objects penetrates the second object may be used as the amount of the interpenetration.

In step 150, visibility of the first object is modified based on the amount of interpenetration between the first object and the second object. For example, a computer simulation program may make the first object invisible. In another example, the computer simulation program may adjust the transparency of the first object. In yet another example, the computer simulation program may modify a color associated with the first object, such that the modified color is closer to, similar to, or substantially alike to a less visible color (e.g., a background color or a color associated with the second object). FIG. 1 ends in step 160.

Figure 2A:
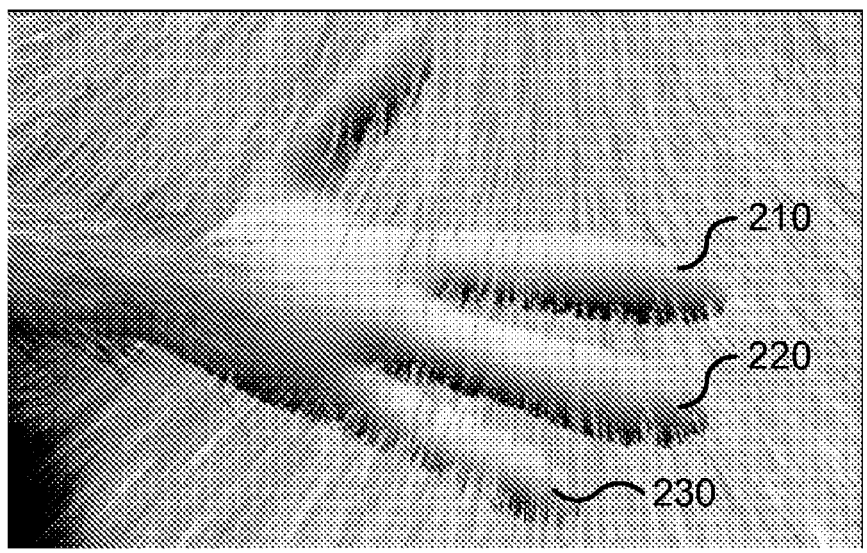
FIGS. 2A and 2B are screenshots depicting intersections between hand and hair on the chest of a character in one embodiment according to the present invention.
Figure 2B:
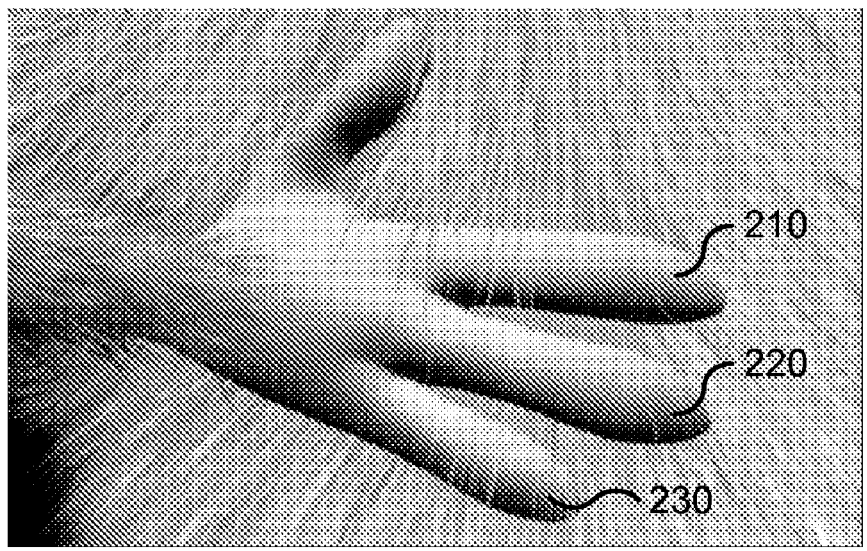

FIGS. 2A and 2B are screenshots depicting intersections between hand and hair on the chest of a character in one embodiment according to the present invention. Referring to FIG. 2A, an animal character is placing a hand on the character's torso. Fingers 210, 220, and 230 of the character move slowly across to a patch of the hair on the torso of the character in a padding or stroking motion over at the hair covering the character's torso. The hair on the torso of the character may be individually animated, or simulated by a computer simulation program, such as using a physically-based numerical technique.

As shown in FIG. 2A, numerous hairs on the character's torso intersect with fingers 210, 220, and 230 during motion of the hand. As the fingers move slowly relative to the patch of hair, one or more hairs may abruptly change from visible to invisible, or vice versa, and cause a subtle, yet apparent, annoying visual artifact. Furthermore, numerous hairs appear to extend or stick out from fingers 210, 220, and 230.

In various embodiments, a computer simulation program modifies the visibility of the hairs on the character's torso that intersect with the fingers. Referring to FIG. 2B, fingers 210, 220, and 230 are shown absent the appearance of hairs that extend or stick out. The computer simulation program also yields a smooth result where hairs do not appear to poke or stick out of fingers 210, 220, and 230 due to small changes in motion or geometry of the scene.

As discussed previously, small chest expansions of the torso of the character due to the character's breathing can cause hair objects to shift ever so slightly with respect to reference objects, such as fingers 210, 220, and 230.

Figure 3A:
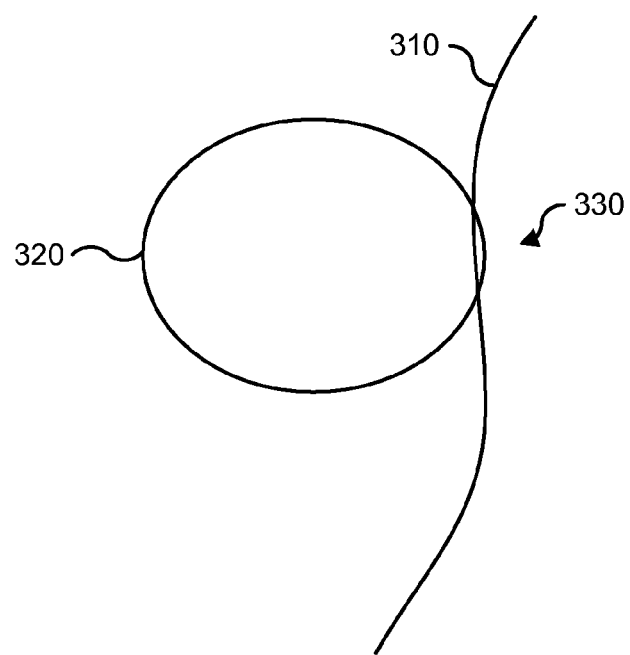
FIGS. 3A and 3B are illustrations depicting a single hair object during and after intersection with a circle like reference object in one embodiment according to the present invention.
Figure 3B:
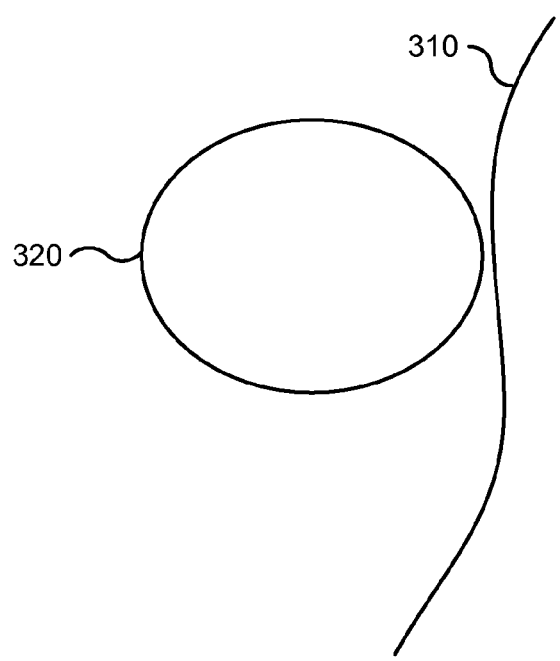

FIGS. 3A and 3B are illustrations depicting a single hair object 310 during and after intersection with a circle like reference object 320 in one embodiment according to the present invention. Referring the FIG. 3A, single hair object 310 intersects with reference object 320 (e.g., finger 210 of FIG. 2) at location 330. However, the intersection at location 330 is small, such that small changes in geometry result in hair object 310 not intersecting or hitting reference object 320.

In this scenario, hair object 310 is very likely to transition from visible to invisible and back subject to the slightest changes in the geometry of hair object 310 relative to reference object 320. Thus, small chest expansions of the torso of the character due to the character's breathing will cause hair object 310 to shift ever so slightly with respect to reference object 320 at location 330. As a result, using a binary quantity (i.e., either zero meaning invisible, or one meaning visible), grazing hairs may continually change from visible to invisible, all without much detectable change of the underlying torso or finger geometry.

Rather than thinking of the visibility state of a hair as a binary quantity, in various embodiments, visibility may be defined as a quantity v ranging from zero to one. The translation of this visibility into a visual appearance can be done in several ways. In one example, if a simulated object, such as hair, is rendered as a cylindrical entity of geometry with radius r, we can render the simulated object with visibility measure v as a cylinder of width yr. Accordingly, as the simulated object goes from completely visible (v=1) to completely invisible (v=0), the radius of the cylinder changes from r to 0. Visually, the cylinder becomes less and less visible as the radius shrinks to or approaches 0.

In another example, the radius r of the cylinder is left fixed, but v is used to modify the transparency of the simulated object. For example, at v=1, the simulated object is made to have no transparency at all, while at v=0.75, the simulated object is made to have a transparency of 0.25, and so on down until v=0. Accordingly, visibility v is determined to vary smoothly with the geometry of the scene, and thus guarantees that the visibility state of hairs will change smoothly as well.

As discussed above, a binary decision leads to hairs whose visibility state changes abruptly. Furthermore, as shown in FIG. 3A, because the amount of hair inside the object was small, a visibility measure v that is based on merely "how much" of the hairs inside an object (rather than whether or not it hit anything) also evidences problems in the visibility state of the hairs.

Figure 4A:
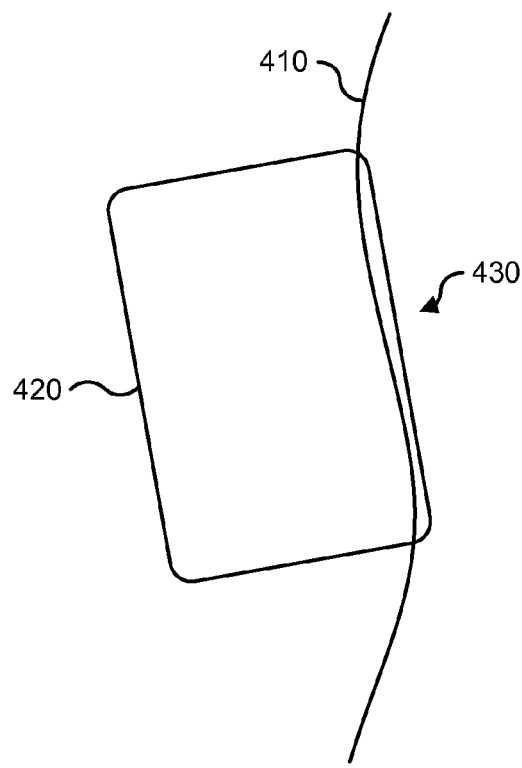
FIGS. 4A and 4B are illustrations depicting a single hair object during and after intersection with a rectangle like reference object in one embodiment according to the present invention.
Figure 4B:
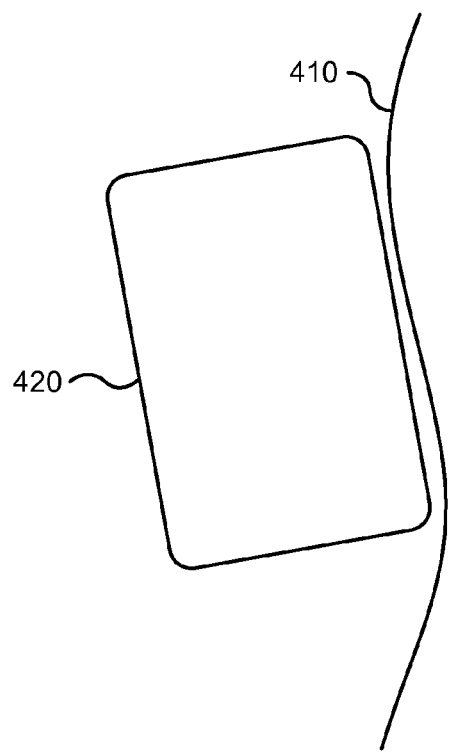

FIGS. 4A and 4B are illustrations depicting a single hair object 410 during and after intersection with a rectangle like reference object 420 in one embodiment according to the present invention. As shown in FIG. 4A, a substantial length of hair object 410 intersects with reference object 420. However, as FIG. 4A and FIG. 4B show, even the amount of hair object 410 inside reference object 420 (i.e., the "how much") can change arbitrarily quickly with a small change in geometry. Thus, v can change very quickly even with little change of the underlying geometry. FIG. 4B depicts that a small change in geometry, even with a determination of how much of hair object 410 intersects with reference object 420, completely frees hair object 410 from intersection with reference object 420.

Accordingly, in various embodiments, the maximum interpenetration depth between a first object and a second object is used to modify visibility of the first object. For example, a computer simulation program may determine the visibility state v of a simulated object according to equation (1):

$$v = \max\left(0, 1 - \frac{d}{d_{max}}\right) \quad (1)$$

In the above equation, d is the maximum distance inside a reference object of any point along a simulated object, and $d_{max}$ is a user-defined threshold. For example, any hair (e.g., a simulated object) more than $d_{max}$ inside a hand or finger (e.g., a reference object) achieves a visibility state of v=0, with the visibility state smoothly arising to v=1 as d goes to zero. This measure does yield a smooth result, as the amount of geometry change needed to reduce the interpenetration depth of the simulated object with the reference object to zero is in fact given by d itself Accordingly, the change in v is directly proportional to the actual change in geometry, as desired.

Figure 5:
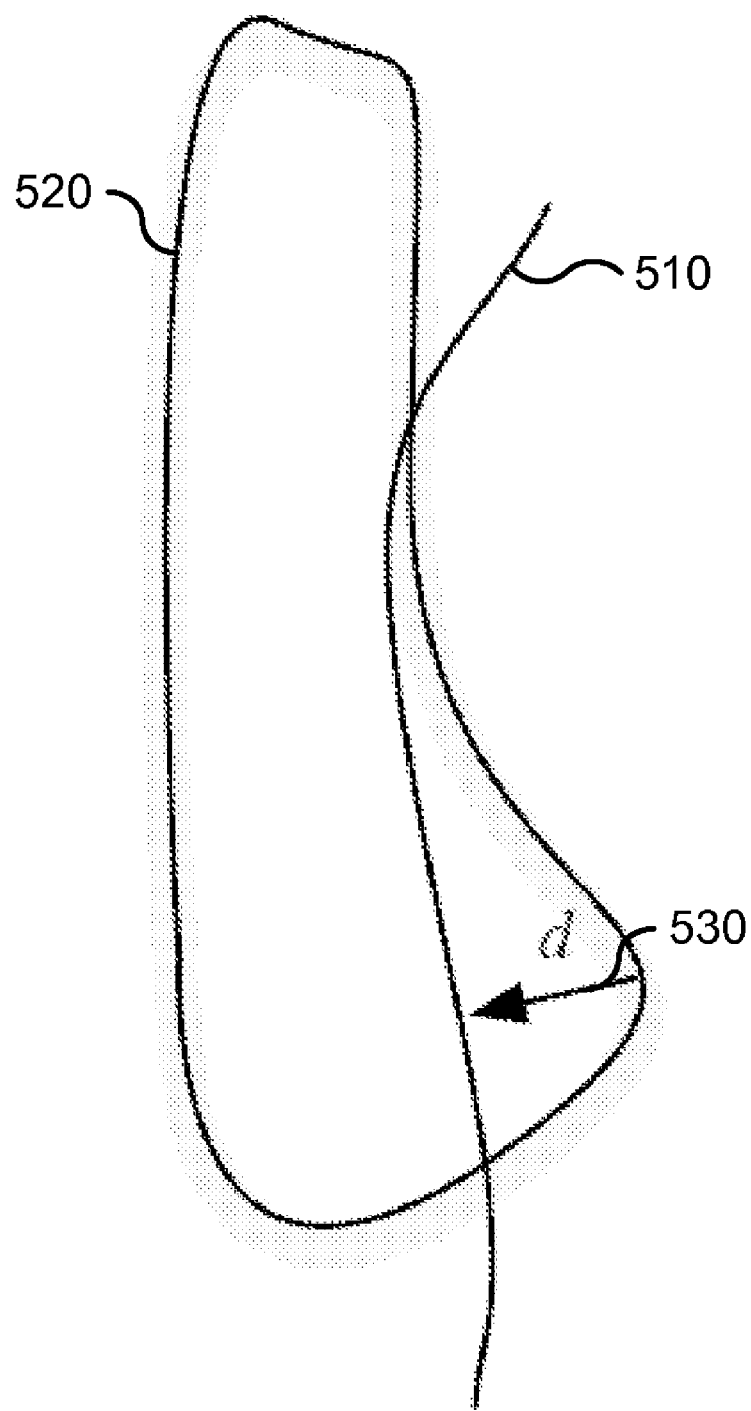
FIG. 5 is an illustration depicting a single hair object during intersection with a reference object in one embodiment according to the present invention.

FIG. 5 is an illustration depicting a single hair object 510 during intersection with a reference object 520 in one embodiment according to the present invention. FIG. 5 illustrates that hair object 510 intersects with reference object 520 to a maximum interpenetration depth 530 (i.e., d). Unlike the previous examples of FIGS. 3A and 3B and FIGS. 4A and 4B, a small change in geometry cannot cause an arbitrarily large change in interpenetration depth 530.

Figure 6:
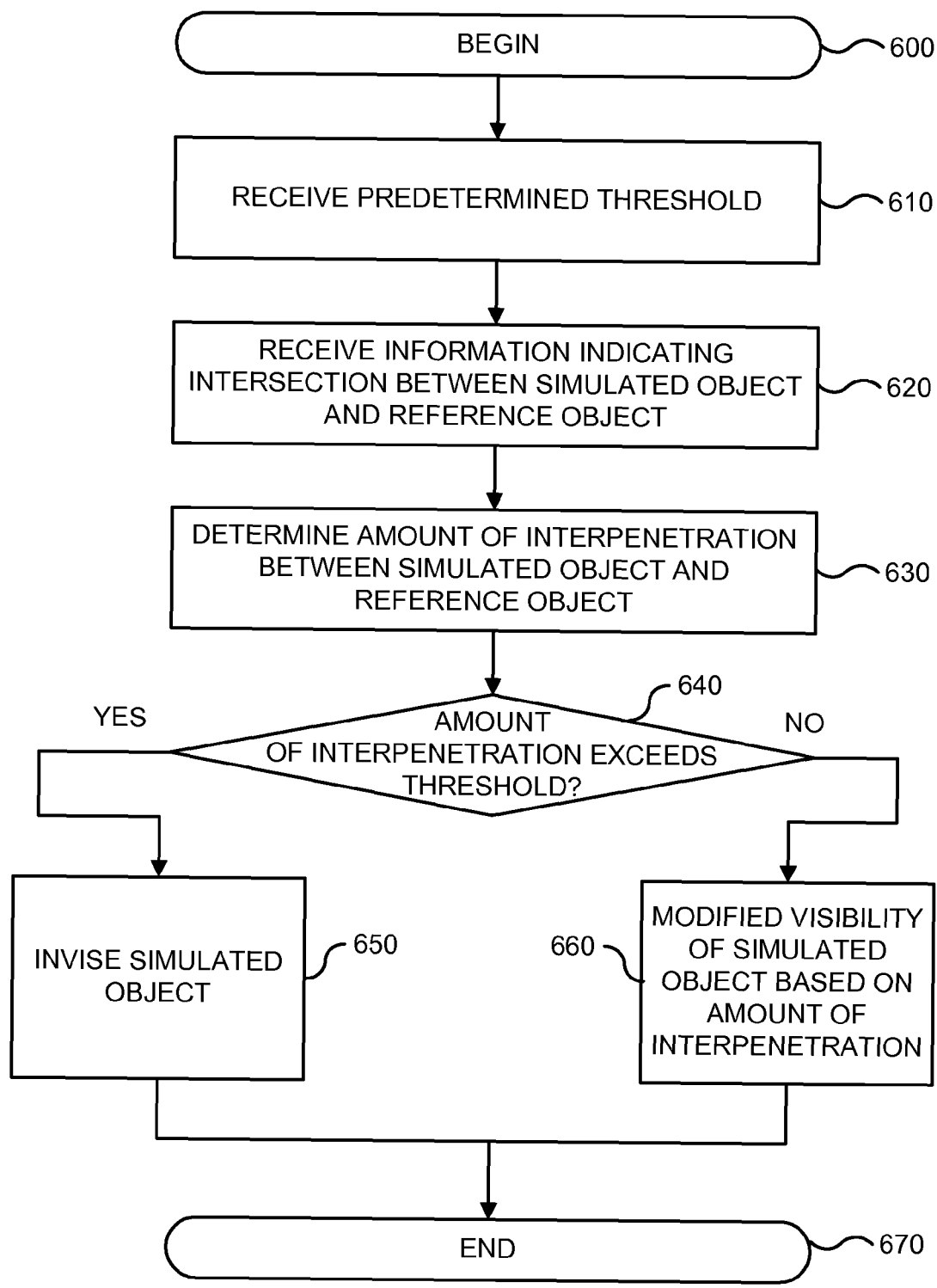
FIG. 6 is a flowchart of a method for modifying visibility of a simulated object intersecting with a reference object in one embodiment according to the present invention.

FIG. 6 is a flowchart of a method for modifying visibility of a simulated object intersecting with a reference object in one embodiment according to the present invention. FIG. 6 begins in step 600.

In step 610, a predetermined threshold is received. For example, a computer simulation program may receive a threshold or limit defining the maximum amount of interpenetration required to completely make a first object invisible when intersecting with a second object. In step 620, information is received indicating an intersection between a simulated object (e.g., a first object) and a reference object (e.g., a second object).

In step 630, the amount of interpenetration is determined between the simulated object and the reference object. For example, for each point along the portion of single hair object 510 of FIG. 5 that intersects with reference object 520, a distance is determined inside reference object 520. From the set of distances, the maximum distance inside reference object 520 of any point along object 510 is determined. In step 640, a determination is made whether the amount of interpenetration exceeds the predetermined threshold.

If the amount of interpenetration exceeds the predetermined threshold, in step 650, visibility of the simulated object is modified such that the simulated object is hidden or made invisible. If the amount of interpenetration does not exceed a predetermined threshold, in step 660, visibility of the simulated object is modified based on the amount of interpenetration. For example, the computer simulation program may adjust the transparency of the simulated object proportional to the amount of the intersection. In another example, the computer simulation program may modify the color of the simulated object closer to another color, such as a color that is less visible, like a background color or a color substantially similar to a color associated with the reference object. FIG. 6 ends in step 670.

Figure 7:
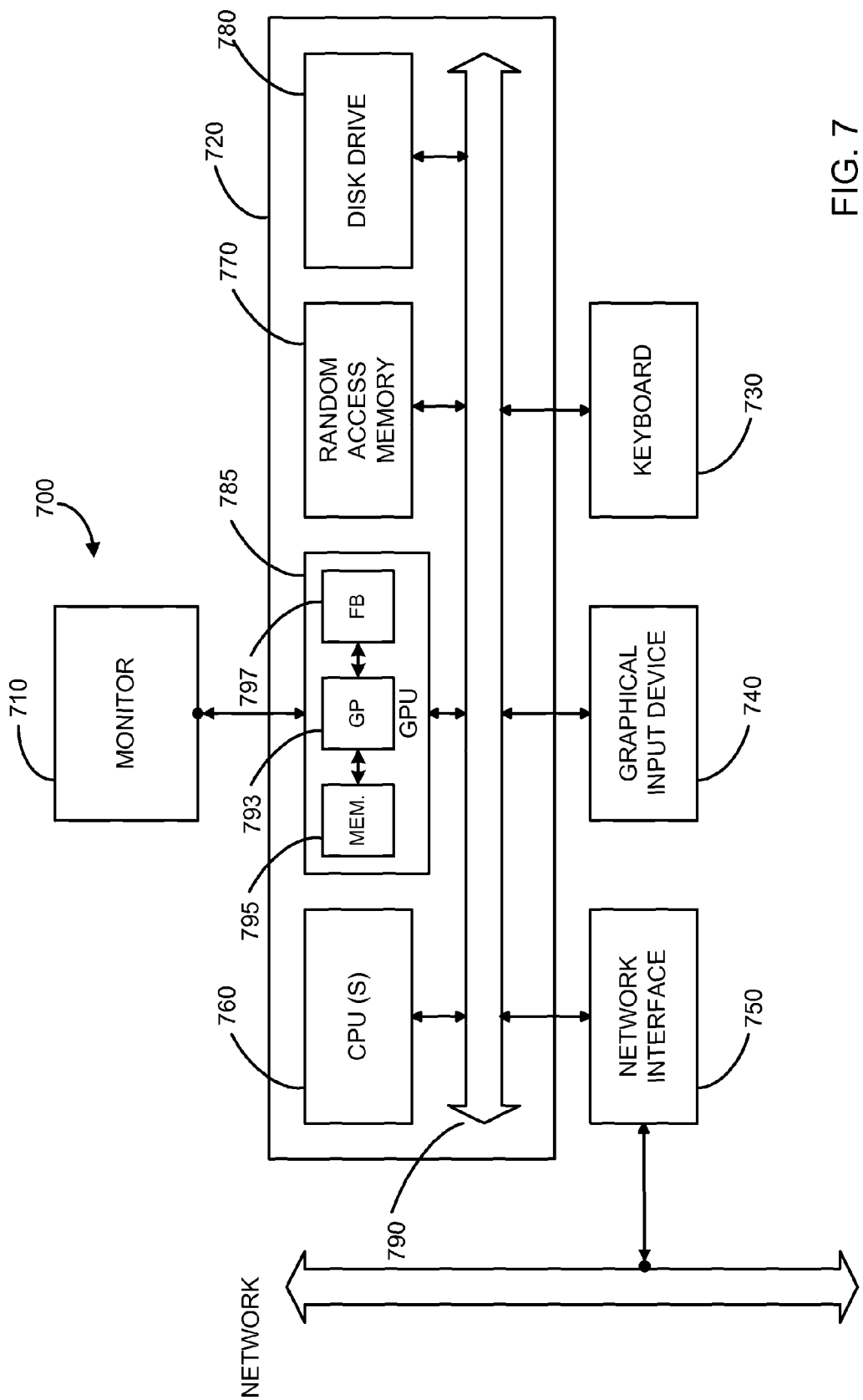
FIG. 7 is a block diagram of a computer system that may be used to practice embodiments of the present invention.

FIG. 7 is a block diagram of a computer system that may be used to practice embodiments of the present invention. FIG. 7 is merely illustrative of an embodiment incorporating the present invention and does not limit the scope of the invention as recited in the claims. One of ordinary skill in the art would recognize other variations, modifications, and alternatives.

In one embodiment, computer system 700 typically includes a monitor 710, computer 720, a keyboard 730, a user input device 740, computer interfaces 750, and the like.

In various embodiments, user input device 740 is typically embodied as a computer mouse, a trackball, a track pad, a joystick, wireless remote, drawing tablet, voice command system, eye tracking system, and the like. User input device 740 typically allows a user to select objects, icons, text and the like that appear on the monitor 710 via a command such as a click of a button or the like.

Embodiments of computer interfaces 750 typically include an Ethernet card, a modem (telephone, satellite, cable, ISDN), (asynchronous) digital subscriber line (DSL) unit, FireWire interface, USB interface, and the like. For example, computer interfaces 750 may be coupled to a computer network, to a FireWire bus, or the like. In other embodiments, computer interfaces 750 may be physically integrated on the motherboard of computer 720, and may be a software program, such as soft DSL, or the like.

In various embodiments, computer 720 typically includes familiar computer components such as a processor 760, and memory storage devices, such as a random access memory (RAM) 770, disk drives 780, a GPU 785, and system bus 790 interconnecting the above components.

In some embodiment, computer 720 includes one or more Xeon microprocessors from Intel. Further, one embodiment, computer 720 includes a UNIX-based operating system.

RAM 770 and disk drive 780 are examples of tangible media configured to store data such as image files, models including geometrical descriptions of objects, ordered geometric descriptions of objects, procedural descriptions of models, scene descriptor files, shader code, a rendering engine, embodiments of the present invention, including executable computer code, human readable code, or the like. Other types of tangible media include floppy disks, removable hard disks, optical storage media such as CD-ROMS, DVDs and bar codes, semiconductor memories such as flash memories, read-only-memories (ROMS), battery-backed volatile memories, networked storage devices, and the like.

In various embodiments, computer system 700 may also include software that enables communications over a network such as the HTTP, TCP/IP, RTP/RTSP protocols, and the like. In alternative embodiments of the present invention, other communications software and transfer protocols may also be used, for example IPX, UDP or the like.

In some embodiments of the present invention, GPU 785 may be any conventional graphics processing unit that may be user programmable. Such GPUs are available from NVIDIA, ATI, and other vendors. In this example, GPU 785 includes a graphics processor 793, a number of memories and/or registers 795, and a number of frame buffers 797.

FIG. 7 is representative of a computer system capable of embodying the present invention. It will be readily apparent to one of ordinary skill in the art that many other hardware and software configurations are suitable for use with the present invention. For example, the computer may be a desktop, portable, rack-mounted or tablet configuration. Additionally, the computer may be a series of networked computers. Further, the use of other micro processors are contemplated, such as Pentium™ or Itanium™ microprocessors; Opteron™ or AthlonXP™ microprocessors from Advanced Micro Devices, Inc; and the like. Further, other types of operating systems are contemplated, such as Windows®, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board.

The embodiments discussed herein are illustrative of one or more examples of the present invention. As these embodiments of the present invention are described with reference to illustrations, various modifications or adaptations of the methods and/or specific structures described may become apparent to those skilled in the art. All such modifications, adaptations, or variations that rely upon the teachings of the present invention, and through which these teachings have advanced the art, are considered to be within the scope of the present invention. Hence, the present descriptions and drawings should not be considered in a limiting sense, as it is understood that the present invention is in no way limited to only the embodiments illustrated.

The present invention can be implemented in the form of control logic in software or hardware or a combination of both. The control logic may be stored in an information storage medium as a plurality of instructions adapted to direct an information-processing device to perform a set of steps disclosed in embodiments of the present invention. Based on the disclosure and teachings provided herein, a person of ordinary skill in the art will appreciate other ways and/or methods to implement the present invention.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method for modifying visibility of objects in a computer-generated scene, the method comprising:
    receiving, at one or more computer systems, information identifying a first object of the computer-generated scene, size and shape of the first object defined by one or more non-positional geometric properties;
    determining, with one or more processors associated with the one or more computer systems, a first value for at least one non-positional geometric property in the one or more non-positional geometric properties of the first object;
    receiving, at the one or more computer systems, information indicating an intersection between the first object and a second object in response to a computer simulation of the first object;
    determining, with the one or more processors associated with the one or more computer systems, a second value for the at least one non-positional geometric property in the one or more non-positional geometric properties of the first object based on an amount of interpenetration between the first object and the second object; and
    storing information in a storage device associated with the one or more computer systems that modifies visibility in the computer-generated scene of the first object based on the second value of the at least one non-positional geometric property of the first object.

2. The method of claim 1 wherein determining the second value for the at least one non-positional geometric property in the one or more non-positional geometric properties of the first object based on the amount of interpenetration between the first object and the second object comprises modifying the first value of the at least one non-positional geometric property in response to a maximum amount of interpenetration between the first object and the second object.

3. The method of claim 1 wherein determining the second value for the at least one non-positional geometric property in the one or more non-positional geometric properties of the first object based on the amount of interpenetration between the first object and the second object comprises:
    determining a maximum distance inside of the second object of a set of points along the first object; and
    modifying the first value of the at least one non-positional geometric property in the one or more non-positional geometric properties of the first object in response to the maximum distance inside of the second object of the set of points.

4. The method of claim 1 further comprising:
    receiving a predetermined threshold; and
    wherein determining the second value for the at least one non-positional geometric property in the one or more non-positional geometric properties of the first object based on the amount of interpenetration between the first object and the second object comprises determining the second value such that the first object is visible in the computer-generated scene when the amount of the interpenetration fails to exceeds the predetermined threshold.

5. The method of claim 4 further comprising:
    wherein determining the second value for the at least one non-positional geometric property in the one or more non-positional geometric properties of the first object based on the amount of interpenetration between the first object and the second object comprises determining the second value such that the first object is invisible in the computer-generated scene when the amount of the interpenetration exceeds the predetermined threshold.

6. The method of claim 1 wherein determining the second value for the at least one non-positional geometric property in the one or more non-positional geometric properties of the first object based on the amount of interpenetration between the first object and the second object comprises determining the second value such that an amount of visibility of the first object is reduced.

7. The method of claim 1 wherein determining the second value for the at least one non-positional geometric property in the one or more non-positional geometric properties of the first object based on the amount of interpenetration between the first object and the second object comprises adjusting a radius associated with the first object based on the amount of interpenetration between the first object and the second object.

8. The method of claim 1 wherein determining the second value for the at least one non-positional geometric property in the one or more geometric properties of the first object based on the amount of interpenetration between the first object and the second object comprises adjusting a transparency property associated with the first object based on the amount of interpenetration between the first object and the second object.

9. A non-transitory computer-readable medium storing computer-executable code for modifying whether simulated objects are visible in a computer-generated scene, the non-transitory computer-readable medium comprising:
    code for receiving information identifying a first object of the computer-generated scene, size and shape of the first object defined by one or more non-positional geometric properties;
    code for determining a first value for at least one non-positional geometric property in the one or more non-positional geometric properties of the first object;

code for receiving information indicating an intersection between the first object and a second object in response to a computer simulation of the first object;

code for determining a second value for the at least one non-positional geometric property in the one or more non-positional geometric properties of the first object based on an amount of interpenetration between the first object and the second object; and code for generating, based on the second value for the at least one non-positional geometric property in either the one or more non-positional geometric properties of the first object, information that modifies visibility in the computer-generated scene of the first object.

10. The non-transitory computer-readable medium of claim 9 wherein the code for determining the second value for the at least one non-positional geometric property in the one or more geometric properties of the first object based on the amount of interpenetration between the first object and the second object comprises code for modifying the first value of the at least one non-positional geometric property in response to a maximum amount of interpenetration between the first object and the second object.

11. The non-transitory computer-readable medium of claim 9 wherein the code for determining the second value for the at least one non-positional geometric property in the one or more non-positional geometric properties of the first object based on the amount of interpenetration between the first object and the second object comprises:

code for determining a maximum distance inside of the second object of a set of points along the first object; and code for modifying the first value of the at least one non-positional geometric property in the one or more non-positional geometric properties of the first object in response to the maximum distance inside of the second object of the set of points.

12. The non-transitory computer-readable medium of claim 9 further comprising:

code for receiving a predetermined threshold; and wherein the code for determining the second value for the at least one non-positional geometric property in the one or more non-positional geometric properties of the first object based on the amount of interpenetration between the first object and the second object comprises code for determining the second value such that the first object is visible in the computer-generated scene when the amount of the interpenetration fails to exceeds the predetermined threshold.

13. The non-transitory computer-readable medium of claim 12 wherein the code for determining the second value for the at least one non-positional geometric property in the one or more non-positional geometric properties of the first object based on the amount of interpenetration between the first object and the second object comprises code for determining the second value such that the first object is invisible in the computer-generated scene when the amount of the interpenetration exceeds the predetermined threshold.

14. The non-transitory computer-readable medium of claim 9 wherein the code for determining the second value for the at least one non-positional geometric property in the one or more non-positional geometric properties of the first object based on the amount of interpenetration between the first object and the second object comprises code for determining the second value such that an amount of visibility of the first object is reduced.

15. The non-transitory computer-readable medium of claim 9 wherein the code for determining the second value for the at least one non-positional geometric property in the one or more non-positional geometric properties of the first object based on the amount of interpenetration between the first object and the second object comprises code for adjusting a radius associated with the first object based on the amount of interpenetration between the first object and the second object.

16. The non-transitory computer-readable medium of claim 9 wherein the code for determining the second value for the at least one non-positional geometric property in the one or more geometric properties of the first object based on the amount of interpenetration between the first object and the second object comprises code for adjusting a transparency property associated with the first object based on the amount of interpenetration between the first object and the second object.

* * * * *